(12) United States Patent
Vaillant et al.

(10) Patent No.: US 8,175,684 B2
(45) Date of Patent: May 8, 2012

(54) METHOD FOR PROCESSING IMAGES AND ASSOCIATED MEDICAL IMAGING SYSTEM

(75) Inventors: Regis Vaillant, Villebon sur Yvette (FR); Vincent Bismuth, Buc (FR); Shri R. Rajesh Prabhu, Bangalore (IN); Laurence Gavit-Houdant, New York, NY (US); Sekar Anantharaman, Tamilnadu (IN)

(73) Assignee: General Electric Company, Schenectady, NY (US)

( * ) Notice: Subject to any disclaimer, the term of this patent is extended or adjusted under 35 U.S.C. 154(b) by 783 days.

(21) Appl. No.: 12/181,411

(22) Filed: Jul. 29, 2008

(65) Prior Publication Data

US 2010/0030068 A1 Feb. 4, 2010

(51) Int. Cl.
*A61B 5/05* (2006.01)
(52) U.S. Cl. .......................... 600/428; 600/407
(58) Field of Classification Search .................. 600/407, 600/410, 424, 425, 428, 437, 473, 476; 128/916
See application file for complete search history.

(56) References Cited

U.S. PATENT DOCUMENTS

| 5,771,895 | A | 6/1998 | Slager |
| 6,463,121 | B1 * | 10/2002 | Milnes ............................ 378/62 |
| 8,029,446 | B2 * | 10/2011 | Horiike et al. ................. 600/463 |
| 2002/0049375 | A1 | 4/2002 | Strommer et al. |
| 2007/0123771 | A1 | 5/2007 | Redel et al. |

OTHER PUBLICATIONS

Bourantas, C. V., et al., "A method for 3D reconstruction of coronary arteries using biplane angiography and intravascular ultrasound images" Computerized Medical Imaging and Graphics, 29 (2005) 597-606.
Martin-Leung, B., et al., "X-IVUS: Integrated x-ray and IVUS system for Cathlab" Medical Imaging 2005: Visualization, Image-Guided Procedures and Display, edited by Robert L. Galloway, Jr., Kevin R. Cleary, Proc. of SPIE, vol. 5744, SPIE, Bellingham, WA, 2005.
Radeva, P. and Rotger, D., "MOTRICO—MOdelado TRIdimensional y simulación de las arterias COronarias," Centre de Visio per Computador, Universtat Automoma de Barcelona (2002).

* cited by examiner

*Primary Examiner* — Michael Rozanski
(74) *Attorney, Agent, or Firm* — Fletcher Yoder, PC

(57) ABSTRACT

A system and method of processing images of a region of interest of a patient is provided. The method comprises acquiring a reference image of the region of interest of the patient; during a pullback of an intravascular sensor in the region of interest, triggering simultaneously the steps of: acquiring a data collected by the sensor characteristic of the region of interest; and acquiring a succession of images of the region of interest associated with the location of the intravascular sensor when acquiring the data, respectively. The method further includes registering the succession of images; associating the location of the intravascular sensor relative to the step of acquiring the data collected by the intravascular sensor; and displaying and positioning the data collected by the intravascular sensor on the reference image in correspondence to the location of the intravascular sensor at the respective step of acquiring the data.

15 Claims, 2 Drawing Sheets

METHOD FOR PROCESSING IMAGES AND ASSOCIATED MEDICAL IMAGING SYSTEM

BACKGROUND

The invention relates to the field of medical imaging and more particularly to a method and system in which a region of interest of a patient may be displayed for the diagnosis and treatment of coronary diseases.

Diagnosis and treatment of coronary artery disease can include acquiring an accurate assessment of vessel morphology. Diagnosis and treatment can include a practitioner guiding and deploying a surgical instrument inside the vascular system of a patient while being assisted by a medical imaging system.

The medical imaging system allows the acquisition, processing and real time display of two-dimensional (2D) images representing the vascular system of the patient and the surgical instrument. With these images, the practitioner may guide the instrument in the vascular system. Diagnosis can include detecting defects such as stenosis (which is an abnormal narrowing in a blood vessel).

FIG. 1 includes a schematic diagram that generally illustrates a vessel 10 with a narrowing 12. Particularly for the diagnosis, an intravascular sensor is employed to collect information for analysis. The "intravascular sensor" can generally include devices that could be introduced in the vessels of the patient with the purpose of sensing some properties of the anatomy, precisely at the location of the sensor on the device. Such devices include, but are not limited, to IVUS (Intra-Vascular Ultra Sound), OCT (Optical Coherent Tomography), Intravascular MRI, temperature probe, pressure wire, and Doppler wire.

Several techniques are known for analyzing information delivered by any type of intravascular sensor or imager in relationship with the vasculature.

A certain known technique employs the practitioner knowledge of anatomical structures that can be identified in a reference image so as to register the information collected along a pullback of the intravascular sensor. One drawback of this certain known technique is that the practitioner is engaged in a medical procedure and is generally not available to interact in a manner to accomplish this task with desired accuracy.

Another technique as described "X-IVUS: Integrated x-ray and IVUS system for the Cathlab," by Bárbara Martin-Leung, Kai Eck, Jörg Bredno, and Til Aach; PHILIPS™ Research Laboratories & Institute for Signal Processing; University of Luebeck, but there is no description of synchronization performed between the sensor and the x-ray imager.

Yet another technique as described in U.S. Publication No. 2002/0049375A1 entitled "Method and apparatus for real time quantitative three-dimensional image reconstruction of a moving organ and intra-body navigation", relies on additional navigation devices to provide the location of the sensor in the three-dimensional (3D) space. Drawbacks of this technique include the additional cost and complexity of the additional navigation device.

BRIEF SUMMARY OF THE INVENTION

The system and method of the subject matter described herein can facilitate the analysis of information delivered by an intravascular sensor or imager in relationship with the vascular system of a patient that meets the needs and addresses the drawbacks described above.

According to one embodiment, a method of processing images of a region of interest of a patient is provided. The method comprises the steps of: acquiring a reference image of the region of interest of the patient; during a pullback of an intravascular sensor introduced inside the region of interest of the patient, triggering simultaneously the steps of acquiring a data collected by the intravascular sensor that is characteristic of the region of interest; and acquiring a succession of images of the region of interest, each of the succession of images associated with the location of the intravascular sensor when acquiring the data, respectively; registering the succession of images for which the data collected by the intravascular sensor are available; associating the location of the intravascular sensor relative to the step of acquiring the data collected by the intravascular sensor characteristic of the region of the interest; and displaying and positioning the data collected by the intravascular sensor on the reference image in correspondence to the location of the intravascular sensor at the respective step of acquiring the data.

According to another embodiment, a medical imaging system is provided. The medical imaging system comprises A medical imaging system operable to process images of region of interest of a patient, comprising: an image acquisition system operable to acquire a reference image of the region of interest of a patient; an intravascular sensor operable during pullback to sense at least one data characteristic of the region of interest, said sensor being introduced inside the region of interest of the patient by a surgical instrument, the sensor in communication with the image acquisition system so as to trigger an acquisition of the at least one data collected by the sensor generally simultaneous with an acquisition of a succession of images of the region of interest in which the sensor is located, and operable in combination to registering the acquired succession of images for which data was collected by the sensor that are available so as to associate a location of the sensor for each of the at least one data collected by the sensor in the region of the interest. The medical imaging system further includes a display system to show a position of the sensor on the reference image that correlates the location of the sensor at the step of acquiring of data during pullback of the sensor.

According to yet another embodiment, a computer readable medium is provided that comprises computer readable program instructions representative of the steps of acquiring a reference image of the region of interest of the patient; during a pullback of an intravascular sensor introduced inside the region of interest of the patient, triggering simultaneously the steps of: acquiring a data collected by the intravascular sensor that is characteristic of the region of interest; and acquiring a succession of images of the region of interest, each of the succession of images associated with the location of the intravascular sensor when acquiring the data, respectively; registering the succession of images for which the data collected by the intravascular sensor are available; associating the location of the intravascular sensor relative to the step of acquiring the data collected by the intravascular sensor characteristic of the region of the interest; and displaying and positioning the data collected by the intravascular sensor on the reference image in correspondence to the location of the intravascular sensor at the respective step of acquiring the data.

BRIEF DESCRIPTION OF THE DRAWINGS

Other features and advantages of the invention will appear in the following description. Embodiments of the invention will be described with reference to the drawings, in which FIG. 1 includes a schematic diagram to generally illustrate a patient vessel with a narrowing.

DETAILED DESCRIPTION OF THE INVENTION

Figure 1:
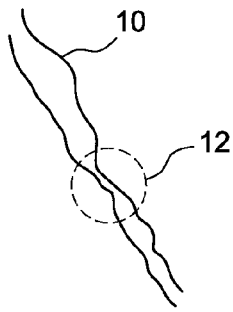
Figure 2:
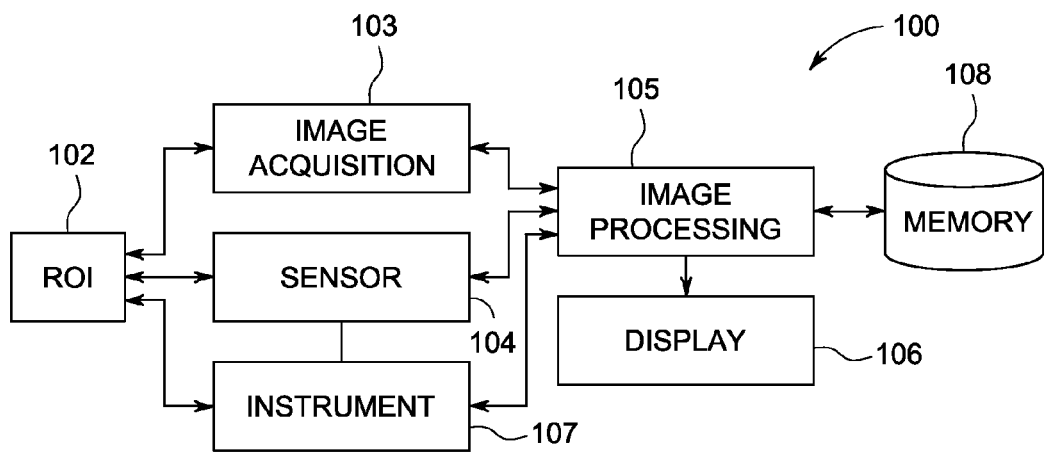
FIG. 2 includes a schematic diagram that illustrates an embodiment of a medical imaging system.

FIG. 2 illustrates an embodiment of a medical imaging system 100 operable to acquire a two-dimensional (2D) image of a region of interest 102 of a patient, and operable to process the acquired image to display an output image to assist a practitioner with progression through the vascular system of the patient.

The embodiment of the medical imaging system 100 comprises an image acquisition system 103, an intravascular sensor 104, an image processing system 105 and a display system 106.

The embodiment of the acquisition system 103 can acquire the 2D image illustrative of a surgical instrument 107 coupled to guide the intravascular sensor 104, the intravascular sensor 104, and the vascular system of the patient.

The image processing system 105 for example can generally include a computer having memory 108 which may be integrated or separated from a processing system 105. The memory 108 can include a computer readable medium operable to provide storage for program instructions or acquired data of the model of the vascular system of the patient. For example, the computer readable medium can include RAM, ROM, PROM, EPROM, EEPROM, Flash, CD-ROM, DVD, or other known computer-readable media or combinations thereof which can be used to carry or store desired program code in the form of instructions or data structures and which can be accessed by a general purpose or special purpose computer or other machine with a processor.

An embodiment of the image acquisition system 103 can include an X-ray acquisition system operable to emit X rays through the region of interest 102 and perform acquisition of resulting images. Yet, the type of image acquisition system 103 (e.g., computed tomography (CT), magnetic resonance imaging (MRI), positron emission tomography (PET), fluoroscopic, ultrasound, etc.) can vary.

Having provided the above-description of an embodiment of a construction of the imaging system 100, the following is a description of a method 200 of processing acquired images of the region of interest 102 of the patient employing the imaging system 100 described above. Although an exemplary embodiment of the method 200 is discussed below, it should be understood that one or more acts or steps comprising the method 200 could be omitted or added. It should also be understood that one or more of the acts can be performed simultaneously or at least substantially simultaneously, and the sequence of the acts can vary. Furthermore, it is embodied that at least several of the following steps or acts can be represented as a series of computer-readable program instructions to be stored in the memory 108 for execution by the system 100.

In the following description, assume that the surgical instrument 107 includes a catheter attached to a guide that can be in combination with an actuator to automatically control movement through the vascular system of the patient. Also assume that the region of interest 102 of the patient (i.e., the vascular system) can be viewed in the acquired images of the medical imaging system 100 (see FIG. 2). Also, assume the intravascular sensor 104 can be introduced in the region of interest 102 of the patient via the catheter attached guide. Also assume the patient can be in an angiographic cathlab and the practitioner can employ x-ray imaging via the image acquisition system 103 to track and control the location of the intravascular sensor 104 relative to the vascular system of the patient. Note that the evaluation of vascular system via x-ray imaging can be in combination with the injection of dye to the vascular system of the patient.

Figure 3:
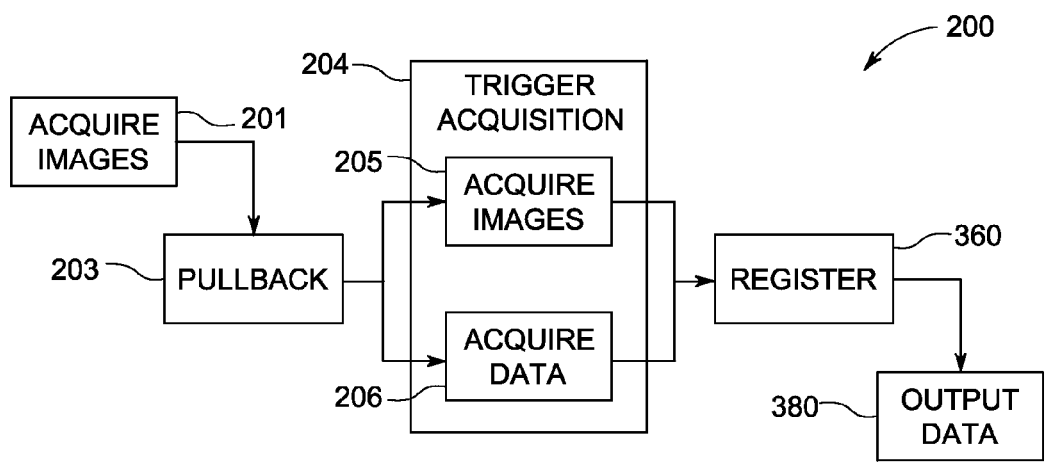
FIG. 3 includes a flow diagram that generally illustrates a method to process acquired images of a region of interest of a patient.

FIG. 3 illustrates an embodiment of the steps that comprise the method 200. Step 201 includes acquiring a sequence or succession of images (e.g., x-ray images) of the vascular system. An embodiment of the Step 201 can occur during injection of dye to the vascular system. Step 201 can further include selecting or identifying a reference image 202 (See FIG. 4) generally illustrative of the region of interest 102 of the patient.

Step 203 includes performing or executing a pullback of the intravascular sensor 104 through the region of interest 102 of the vascular system of the patient.

According to one mode of operation, the practitioner can maneuver the intravascular sensor 104 in a manual mode, and push or pull the intravascular sensor 104 using the attached guide or instrument 107.

According to another mode of operation, the instrument 107 can include a pullback actuator operable to automatically move the intravascular sensor 104 with a generally continuous motion through the region of interest 102 of the vascular system of the patient. The pullback actuator can pull the sensor 104 or attached instrument 107 (e.g., guide, actuator, catheter) at a generally constant speed (for example 0.5 mm/second or 1 mm/second). The step of performing the pullback could extend over 5 to 10 cm. The embodiment of the instrument 107 (e.g., catheter, guide, actuator) to perform the pullback can be employed for any type of vessels, including coronary vessels.

With pullback of the intravascular sensor 104 at a constant speed, an embodiment of step 203 can include identifying a degree of the vessel foreshortening, i.e., the projective effect making the vessel appear shorter on image than the reality, from the observed apparent location of the instrument 107 or intravascular sensor 104 in the x-ray image.

Step 204 includes triggering acquisition of data and images during or with pullback of the intravascular sensor 104 in step 203. An embodiment of step 204 can include a) a step 205 of acquiring or acquisition of a succession of x-rays images with the image acquisition system 103; and b) a step 206 of acquiring or acquisition of data (e.g., temperature data) characteristics of a vessel in the region of interest 102 of the vascular system of the patient.

Figure 4:
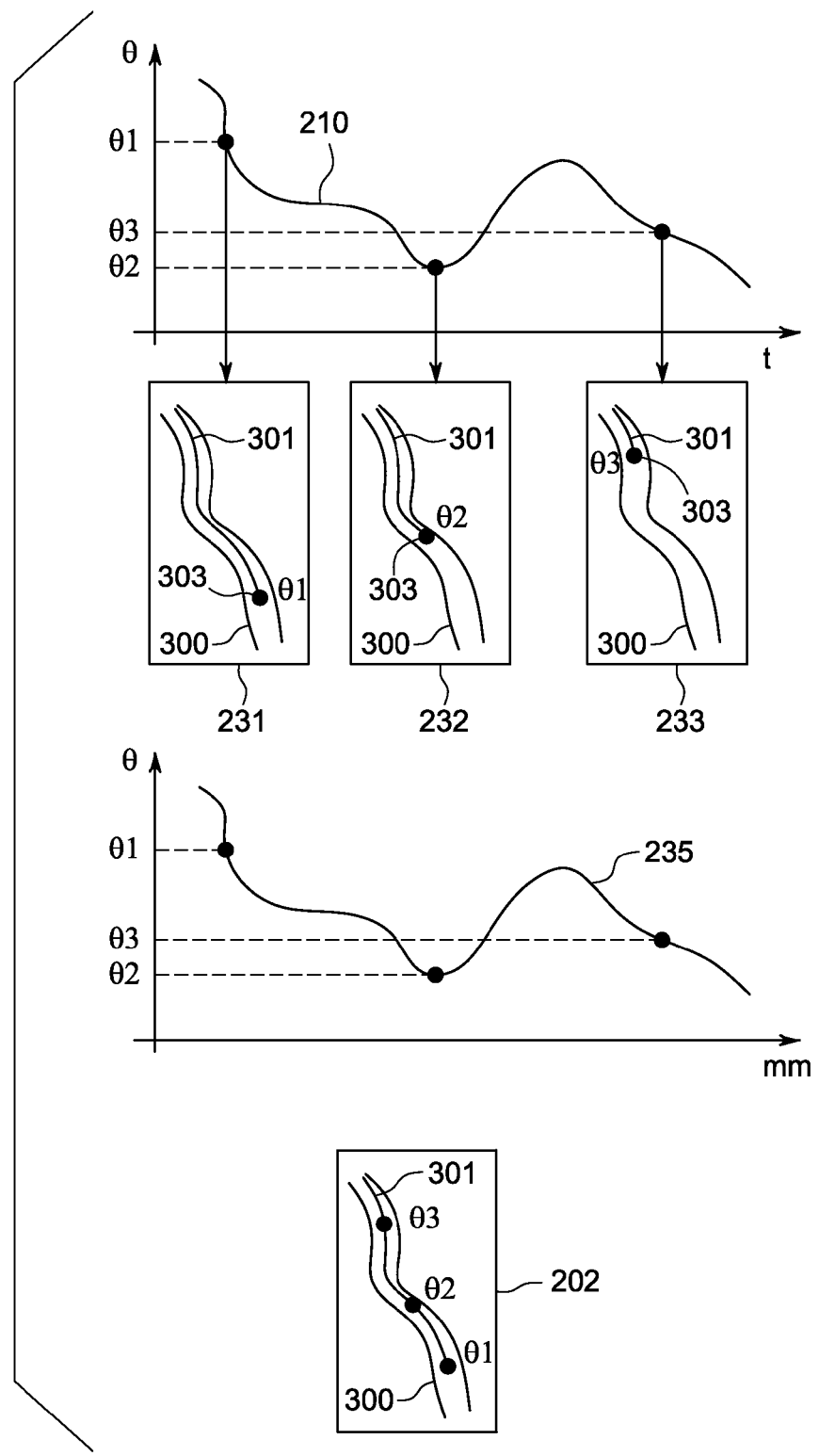
FIG. 4 includes a series of schematic diagrams generally illustrative of an embodiment of the method of FIG. 3 to process acquired images of a region of interest of a patient.

Referring to FIG. 4, one embodiment of step 206 can include collecting or acquiring temperature values $\theta_1$, $\theta_2$, $\theta_3$ relative to time (t) with the intravascular sensor 104, and outputting a signal 210 representing these measured or values $\theta_1$, $\theta_2$, $\theta_3$ collected by the intravascular sensor 104 relative to or according to the time (t). Another embodiment of the exploitation these values $\theta_1$, $\theta_2$, $\theta_3$ can be associated or correlated relative to a position along the examined vessel of the vascular system of the patient.

Step 206 can occur generally simultaneously with step 205, such that the intravascular sensor 104 can acquire data values ($\theta_1$, $\theta_2$, $\theta_3$) with acquisition of each of a succession of images (e.g., images 231, 232, 233) in step 205 in association with or correlation to time of acquisition by the image acquisition system 103. Of course, the type and number of data values collected by the intravascular sensor 104 and the type and number of acquired images by the image acquisition system can vary.

An embodiment of the images 231, 232, 233 can include an illustration of a vessel 300 (or more), the guide 301 and the intravascular sensor 303.

Step 360 can include registering the succession of images 231, 232, 233 where data collected by the intravascular sensor 104 is achieved. From the step 360 registering the succession of images 231, 232, 233, the system 100 can associate the measured value of data (e.g., temperature values $\theta_1$, $\theta_2$, $\theta_3$) for each point of measurement or position of the illustration of the intravascular sensor 303 along the vessel 300 in the images 231, 232, 233. According to above-described acquired data, an embodiment of step 204 can include outputting a signal 235 representing the data values (e.g., temperature values $\theta_1$, $\theta_2$, $\theta_3$) collected by the intravascular sensor 104 according to the position of the intravascular sensor 104 along the vessel as defined in the images 231, 232, 233.

An embodiment of step 360 can include selecting, adjusting, or changing a cadence of acquisition relative to the desired accuracy of the registration and the speed of pullback of the intravascular sensor 104 through the vessel.

One embodiment of the image acquisition system 103 in combination with the intravascular sensor 104 can acquire the x-ray images at exactly or about the same phase of the Electro Cardio Gram (ECG), and synchronize the acquisitions of the succession of images 231, 232, 233 with the measurement of data collected by the intravascular sensor 104. This embodiment can include the following strategies: a) synchronizing the time of the image acquisition system 103 to collect images of the vascular structure with the instrument 107 that manages movement of the intravascular sensor 104 through the region of interest 102 of the patient; or b) communicating (e.g., via a wireless or wired connection) between the image acquisition system 103 and the instrument 107 or sensor 104 so as to trigger image acquisition by the image acquisition system 103 when the current ECG phase matches the illustrated phase of the imaged anatomy in region of interest in the reference image 202.

For example, in response to the trigger signal of step 204, the image acquisition system 103 can await the appropriate phase of an electrocardiogram (ECG) signal before doing an x-ray exposure to capture an image of the region of interest 102 of the patient.

One embodiment of the registering step 360 can be performed when the intravascular sensor 104 is active such that the data collected by the intravascular sensor 104 is available. The registration step 360 can include compensating for movements induced by the patient's breathing, motion and cardiac beat (e.g., if the images 231, 232, 233 have not been acquired at the same phase of the cardiac cycle relative to the reference image 202).

With registration of the succession of acquired images (231, 232, 233), the location of the intravascular sensor 104 at the number of points or locations in time of collected data can be known with respect to the reference image 202.

Optionally, the method 200 can comprise a step of analyzing the acquired succession of images 231, 232, 233 and adjusting the exposed field of view of the image acquisition system 103 around the intravascular sensor 104 to minimize radiation.

One embodiment of the intravascular sensor 104 can operate at a higher frequency relative to the frequency of acquisition of the succession of images 231, 232, 233 with the image acquisition system 103 such that the sensor locations can be interpolated between each of the succession of images 231, 232, 233. This interpolation can be timed-based and can provide a location for each intravascular point of measurement by the sensor 104.

The above-description of the system 100 and method 200 can be such that the registering step 360 can be executed totally independent of and thereby does not require additional tracking or navigation devices (e.g., electromagnetic sensors, radio frequency tracking, etc.) to track motion of the intravascular sensor 104 during acquisition of data. Rather, the intravascular sensor 104 can be localized relative to the acquired images 202, 231, 232, or 233 precisely via image analyses software to identify the intravascular sensor 104 in the acquired of images 202, 231, 232, or 233 of the region of interest 102 of the patient.

Step 380 generally includes outputting the measured data (e.g., temperature values) collected by the intravascular sensor 104 positioned and displayed on the reference image 202 illustrative of the region of interest 102 to be examined. Using the common timeline or clock for the image acquisition system 103 and intravascular sensor 104 and/or the trigger between therebetween 103 and 104, an embodiment of the step 380 can include automatically positioning the location of the data $\theta_1$, $\theta_2$, $\theta_3$ collected by the intravascular sensor 104 relative to or along the illustration of the vessel 300 in the reference image 202.

A technical effect of the above-described system 100 and method 200 can be operable to automatically register the information delivered by the intravascular sensor 104 relative to the reference image 202 of the region of interest of the patient. Then, the practitioner has the capability to associate points along the vessel 300 with the corresponding information collected or delivered by the intravascular sensor 104. The point along the vessel 300 can be chosen on the reference image 202. The registration step 360 can be performed automatically to ensure maximum accuracy and avoid distraction of the practitioner with guidance of the instrument 107 or sensor 104 through the region of interest 102 of the patient.

Another technical effect of the above-described system 100 and method 200 include an ability to perform registering without a need of costly localization dedicated devices (e.g., navigation devices such as electromagnetic sensors), and can be fully automatic, without a need of intervention by the practitioner. The system 100 and method 200 can provide desired registration accuracy performed via observation of the sensor 104 in the patient anatomy without the use of an additional localization technique (e.g., navigation devices such as electromagnetic sensors).

Another technical effect of the system 100 and method 200 includes lack of constraint of the practitioner to perform the intravascular measurements only along a trajectory of the pullback of the sensor 104. Rather, the system 100 and method 200 allow measurements of data with a free motion of the sensor 104 (such as when the change in speed and direction are less frequent than the sampling frequency of the x-ray images). Another technical effect of the system 100 and method 200 include employing a single projection of an x-ray image acquisition in synchronization with the collection of data by the intravascular sensor 104.

Embodiments of the subject matter described herein include method steps which can be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of computer program code for executing steps of the methods disclosed herein. The particular sequence of such computer- or processor-executable instructions or associated data structures represent examples of corresponding acts for implementing the functions described in such steps.

Embodiments of the subject matter described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the subject matter described herein may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

This written description uses examples to disclose the subject matter, including the best mode, and also to enable any person skilled in the art to make and use the subject matter described herein. Accordingly, the foregoing description has been presented for purposes of illustration and description, and is not intended to be exhaustive or to limit the subject matter to the precise form disclosed, and modifications and variations are possible in light of the above teachings or may be acquired from practice of the subject matter described herein. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A method of processing images of a region of interest of a patient, comprising the steps of:
    acquiring a reference image of the region of interest of the patient;
    during a pullback of an intravascular sensor introduced inside the region of interest of the patient, triggering simultaneously the steps of:
        acquiring a set of non-image data using the intravascular sensor, wherein the non-image data is characteristic of the region of interest, and
        acquiring a succession of images of the region of interest, each of the succession of images associated with the location of the intravascular sensor when acquiring the non-image data, respectively;
    registering the succession of images for which the non-image data collected by the intravascular sensor are available;
    associating the location of the intravascular sensor relative to the step of acquiring the non-image data using the intravascular sensor; and
    displaying values corresponding to the non-image data collected by the intravascular sensor at positions on the reference image corresponding to the location at which the respective non-image data was collected.

2. The method according to claim 1, wherein the step of acquiring the non-image data using the intravascular sensor and the step of acquiring the succession of images are performed at generally the same phase of an electrocardiogram of the patient.

3. The method of claim 1, wherein the step of acquiring the non-image data using the intravascular sensor is performed at a first frequency and the step of acquiring the succession of images is performed at a second frequency, said first frequency being generally greater than the second frequency.

4. The method according to claim 3, wherein the location of the intravascular sensor is time interpolated so that the frequency of the interpolated locations is generally equal to the first frequency.

5. The method according to claim 1, wherein the pullback of the intravascular sensor is implemented by a pullback actuator.

6. The method according to claim 1, wherein the pullback of the intravascular sensor is implemented at a constant speed.

7. The method of claim 1, comprising changing a cadence of data acquisition based on the speed of the pullback of the intravascular sensor.

8. The method of claim 1, wherein the non-image data comprises temperature data.

9. The method of claim 1, further comprising displaying a respective position of the intravascular sensor on the reference image with each of the values corresponding to the non-image data at the positions on the reference image corresponding to the location at which the respective non-image data was collected.

10. A medical imaging system operable to process images of region of interest of a patient, comprising:
    an image acquisition system operable to acquire a reference image of the region of interest of a patient;
    an intravascular sensor operable during pullback to sense non-image data characteristic of the region of interest, said sensor configured to be introduced inside the region of interest of the patient by a surgical instrument, the sensor in communication with the image acquisition system so as to trigger an acquisition of the non-image data collected by the sensor generally simultaneous with an acquisition of a succession of images of the region of interest in which the sensor is located, and operable in combination to register the acquired succession of images for which non-image data was collected by the sensor that are available so as to associate a location of the sensor for each of the non-image data collected by the sensor in the region of interest; and
    a display system to show, on the reference image, a position of the sensor at the time each measurement of non-image data occurs and the corresponding measured value of the non-image data at the position.

11. The medical imaging system of claim 10, wherein the medical imaging system is configured to change a cadence of data acquisition based on the speed of the pullback of the intravascular sensor.

12. The medical imaging system of claim 10, wherein the non-image data comprises temperature data.

13. A non-transitory computer-readable medium that comprises computer-readable program instructions representative of the steps of:
    acquiring a reference image of a region of interest of a patient;

during a pullback of an intravascular sensor introduced inside the region of interest of the patient, triggering simultaneously the steps of:
  acquiring a set of non-image data using the intravascular sensor, wherein the non-image data is characteristic of the region of interest, and
  acquiring a succession of images of the region of interest, each of the succession of images associated with the location of the intravascular sensor when acquiring the non-image data, respectively;
registering the succession of images for which the non-image data collected by the intravascular sensor are available;
associating the location of the intravascular sensor relative to the step of acquiring the non-image data using the intravascular sensor; and
displaying values corresponding to the non-image data collected by the intravascular sensor at positions on the reference image corresponding to the location at which the respective non-image data was collected.

14. The non-transitory computer-readable medium of claim 13, comprising computer-readable program instructions representative of changing a cadence of data acquisition based on the speed of the pullback of the intravascular sensor.

15. The non-transitory computer-readable medium of claim 13, wherein the non-image data comprises temperature data.

* * * * *